United States Patent [19]

Kissin et al.

[11] Patent Number: 5,258,345
[45] Date of Patent: Nov. 2, 1993

[54] HIGH-ACTIVITY POLYETHYLENE CATALYSTS

[75] Inventors: Yury V. Kissin, East Brunswick; Robert I. Mink, Warren; Thomas E. Nowlin, West Windsor, all of N.J.

[73] Assignee: Mobil Oil Corporation, Fairfax, Va.

[21] Appl. No.: 979,694

[22] Filed: Nov. 20, 1992

[51] Int. Cl.$^5$ ............................................. C08F 4/656
[52] U.S. Cl. ...................... 502/116; 502/115; 502/117; 502/119; 502/120; 502/125; 526/128
[58] Field of Search ............. 502/115, 116, 117, 119, 502/120, 125

[56] References Cited

U.S. PATENT DOCUMENTS

| | | | |
|---|---|---|---|
| 2,905,645 | 9/1959 | Anderson et al. | 252/129 |
| 2,912,419 | 11/1959 | Peters et al. | 260/93.7 |
| 2,936,291 | 5/1960 | Peters et al. | 252/131 |
| 3,052,660 | 9/1962 | Osgan | 260/38.2 |
| 3,574,138 | 4/1971 | Ziegler et al. | 252/429 |
| 3,787,384 | 1/1974 | Stevens et al. | 260/94.9 |
| 3,989,881 | 11/1976 | Yamaguchi et al. | 526/125 |
| 4,063,009 | 12/1977 | Ziegler et al. | 526/159 |
| 4,076,698 | 2/1978 | Anderson et al. | 526/348.6 |
| 4,148,754 | 4/1979 | Strobel et al. | 252/429 |
| 4,173,547 | 11/1979 | Graff | 252/429 |
| 4,293,673 | 10/1981 | Hamer et al. | 526/88 |
| 4,296,223 | 10/1981 | Berger | 526/125 |
| 4,302,566 | 11/1981 | Karol et al. | 526/125 |
| 4,335,016 | 6/1982 | Dombro | 502/125 X |
| 4,374,753 | 2/1983 | Pullukat et al. | 502/125 X |
| 4,378,304 | 2/1983 | Dombro | 252/429 |
| 4,458,058 | 7/1984 | Dombro | 526/129 |
| 4,478,988 | 10/1984 | Pullukat et al. | 526/128 |
| 4,481,301 | 11/1984 | Nowlin et al. | 502/104 |
| 4,558,024 | 12/1985 | Best | 502/115 |
| 4,558,025 | 12/1985 | Best | 502/115 |
| 4,579,835 | 4/1986 | Best | 502/120 |
| 4,634,746 | 1/1987 | Etherton et al. | 526/129 |
| 4,672,096 | 6/1987 | Nowlin | 526/129 |
| 4,716,206 | 12/1987 | Fujita et al. | 526/139 |
| 4,727,049 | 2/1988 | Furuhashi et al. | 502/115 |
| 4,732,882 | 3/1988 | Allen et al. | 502/103 |
| 4,832,897 | 5/1989 | Van der Molen | 264/564 |
| 4,833,111 | 5/1989 | Nowlin | 501/107 |
| 4,849,389 | 7/1989 | Nowlin et al. | 502/107 |
| 4,888,318 | 12/1989 | Allen et al. | 502/105 |
| 4,908,420 | 3/1990 | Sasaki et al. | 526/76 |
| 4,954,470 | 9/1990 | Nowlin et al. | 502/107 |

FOREIGN PATENT DOCUMENTS

| | | |
|---|---|---|
| 0120503 | 10/1984 | European Pat. Off. |
| 231102 | 8/1987 | European Pat. Off. |
| 0306939 | 3/1989 | European Pat. Off. |
| 435557 | 7/1991 | European Pat. Off. |
| 435627 | 7/1991 | European Pat. Off. |

OTHER PUBLICATIONS

Macromolecules, vol. 15, No. 3, 1982, pp. 831-834 (no month available).

*Primary Examiner*—Patrick P. Garvin
*Attorney, Agent, or Firm*—Alexander J. McKillop; Malcolm D. Keen; Marina V. Schneller

[57] ABSTRACT

The invention relates to catalysts which produce linear low density polyethylene with a bimodal molecular weight distribution, particularly those containing a high molecular weight fraction. The catalysts are formed by contacting a carrier with an organomagnesium compound to incorporate magnesium into the carrier, and subsequently contacting the carrier containing the incorporated magnesium with a silicon compound and subsequently with a transition metal source; the transition metal containing intermediate is again treated with an organomagesium compound to form a catalyst precursor, and the catalyst precursor is activated with dimethylaluminum chloride.

25 Claims, 1 Drawing Sheet

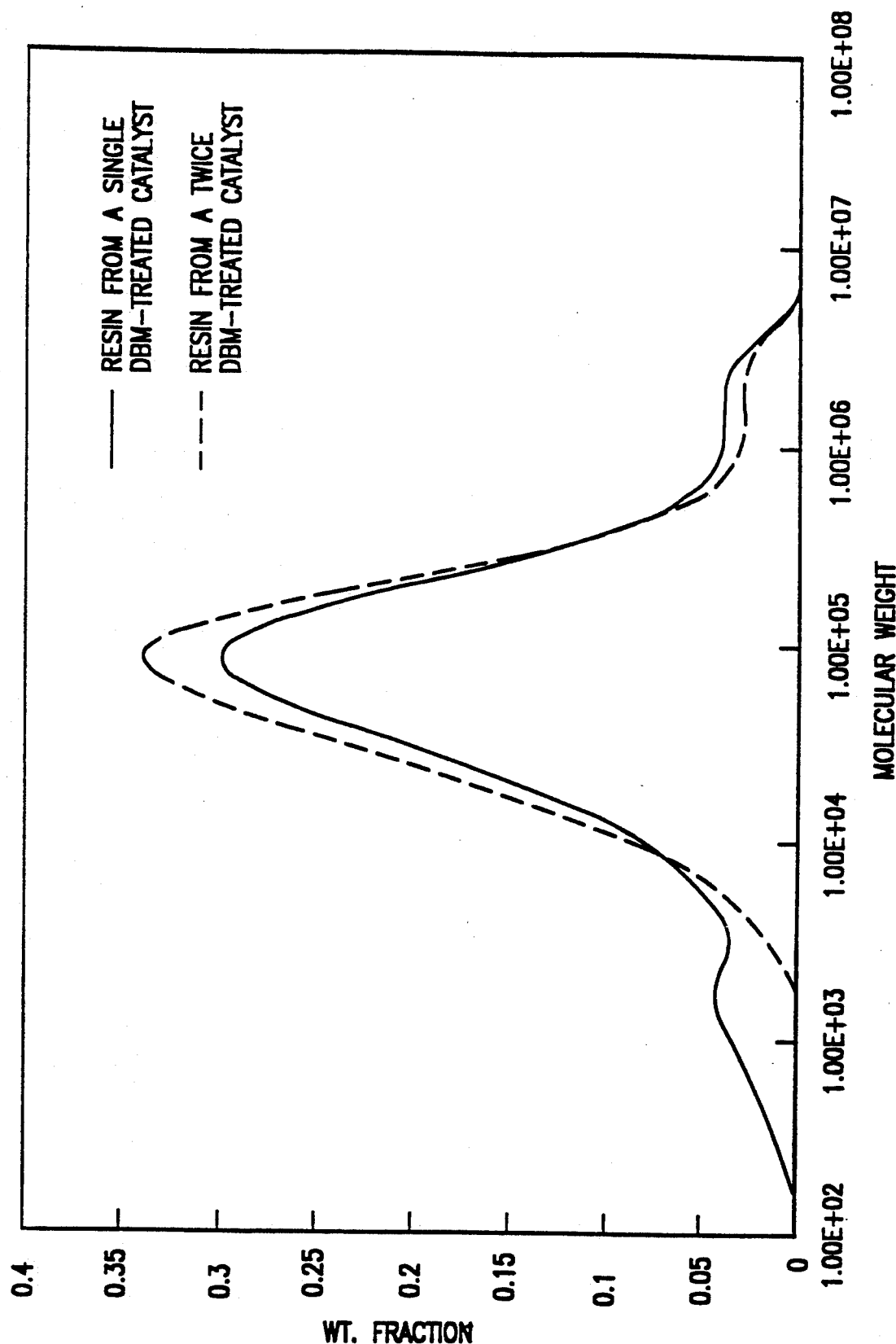

HIGH-ACTIVITY POLYETHYLENE CATALYSTS

FIELD OF THE INVENTION

The present invention relates to a method for copolymerizing ethylene and alpha-olefins, a catalyst for such a copolymerization and a method for producing such a catalyst. A particular aspect of the present invention relates to a method for producing linear low density copolymers of ethylene, hereinafter referred to as "LLDPE".

LLDPE resins possess properties which distinguish them from other polyethylene polymers such as homopolymers of polyethylene. Certain of these properties are described in the Anderson et al U.S. Pat. No. 4,076,698.

In addition to those properties, LLDPE resins produced in accordance with the invention contain a relatively high molecular weight fraction and are bimodal in their molecular weight distribution. LLDPE films manufactured from these polymers exhibit excellent optical properties with respect to haze and gloss. Furthermore, the resins can be blown into film by high stalk extrusion techniques.

BACKGROUND OF THE INVENTION

As far as catalysts for copolymerization of ethylene with alpha-olefins are concerned, three properties of the catalysts are of a major importance:

1) molecular weight distributions of the resins produced with the catalysts,
2) the response of the resin molecular weight to hydrogen,
3) ability of the catalysts to effectively copolymerize ethylene and alpha-olefins.

One of the measures of the molecular weight distribution of an LLDPE resin is the melt flow ratio (MFR), which is the ratio of the high-load melt flow index HLMI or $I_{21}$) to the melt index ($I_2$) for a given resin: MFR=$I_{21}/I_2$. The MFR value is believed to be an indication of the molecular weight distribution of a polymer: the higher the MFR value, the broader the molecular weight distribution. LLDPE resins usually have relatively low MFR values, e.g., of about 20 to about 45.

Molecular weight of ethylene copolymers can be controlled in a known manner, e.g., by using hydrogen. With the catalysts produced according to the present invention, molecular weight can be suitably controlled with hydrogen when the polymerization is carried out at temperatures from about 30° to about 105° C. This control may be evidenced by a measurable positive change in the melt flow indexes ($I_2$ and $I_{21}$) of the polymers produced. A relatively high sensitivity of the resin molecular weight to the amount of hydrogen present during a polymerization process is an important feature of the catalyst compositions of this invention.

Another important property of catalyst compositions for ethylene/alpha-olefin copolymerization is the ability thereof to effectively copolymerize ethylene with higher alpha-olefins, e.g., $C_3$–$C_{10}$ alpha-olefins, to produce resins having low densities. This property of the catalyst composition is referred to as "higher alpha-olefin incorporation property" and is usually measured by determining the amount of a higher alpha-olefin (e.g., 1-butene, 1-hexene or 1-octene) required in a polymerization process to produce a copolymer of ethylene and the higher alpha-olefin having a given copolymer composition and a given density. The lesser is the amount of the higher alpha-olefin required to produce the resin of a given density, the higher are the production rates and, therefore, the lower is the cost of producing such a copolymer. Effective high alpha-olefin incorporation is especially important in the gas-phase fluid bed process, because relatively high concentrations of higher o-olefins in the fluid-bed reactor may cause poor particle fluidization.

It is an object of the present invention to provide a high-activity catalyst for copolymerization of ethylene and alpha-olefins yielding products of bimodal molecular weight distributions.

It is an additional object of the present invention to provide a catalytic process for copolymerizing ethylene and alpha-olefins which yields LLDPE of a bimodal molecular weight distribution at high productivity.

It is also an object of the present invention to provide a high activity catalyst compositions for the copolymerization of ethylene and alpha-olefins which exhibits relatively high melt flow index response to hydrogen.

SUMMARY OF THE INVENTION

A supported catalyst composition of this invention is prepared in a multi-step process. In the first step, a slurry of a solid, porous carrier in a non-polar solvent is contacted with at least one organomagnesium compound of the formula

$$R_mMgR'_n$$

where R and R' are the same or different $C_2$–$C_{12}$ alkyl groups, preferably $C_4$–$C_{10}$ alkyl groups, more preferably $C_4$–$C_8$ alkyl groups, and most preferably both R and R' are butyl groups, and m and n are each 0, 1 or 2, providing that m+n=2.

Subsequently, in the second step the mixture of the carrier containing magnesium is contacted with at least one silane compound, e.g., of the formula

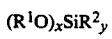
$$(R^1O)_xSiR^2_y$$

wherein x is 1, 2, 3, or 4 and y=4−x; $R^1$ is a hydrocarbyl group of 1 to 10 carbon atoms; and $R^2$ is halogen, preferably chlorine, or a hydrocarbyl group of 1 to 10 carbon atoms, or hydrogen. In the third step, the mixture is contacted with at least one transition metal compound soluble in a non-polar solvent.

A critical aspect of the invention is the treatment of the transition metal-containing intermediate with an additional amount of the organomagesium compound $R_m$ Mg $R'_n$ in the last step of the catalyst preparation procedure.

This additional second treatment with an organomagnesium compound increases the catalytic activity of the resulting catalyst compared to the activity of the catalyst formed with a single organomagnesium treatment step, and increases the melt flow index response to hydrogen compared to the melt flow index response of the catalyst formed with a single organomagnesium treatment step.

The resulting activated catalyst composition exhibits substantially higher productivity in copolymerization of ethylene and alpha-olefins, and substantially improved $C_3$–$C_{10}$ alpha-olefin incorporation properties. The catalyst also produces polymers having bimodal molecular weight distributions, with both a distinct high molecular weight component and a lower molecular weight component, as evidenced from their gel permeation chromatograms. Such resins also have a higher compositional uniformity, as indicated by their relatively lower melting points, compared to those of the resins prepared with the single organomagnesium compound-treated catalyst compositions.

DESCRIPTION OF THE DRAWING

In the FIGURE of Drawing, the dotted line is a gel permeation chromatogram of an ethylene-hexene LLDPE resin prepared with one of the catalysts of the invention (catalyst of Example 1).

The solid line is a gel permeation chromatogram of an ethylene-hexene LLDPE resin prepared with a comparative catalyst (Catalyst of Example 2).

DETAILED DESCRIPTION

In accordance with the present invention, supported transition metal species, preferably titanium species, are incorporated onto a suitable support by impregnating this support first with an organomagnesium compound and utilizing this supported magnesium compound to react with a tetravalent titanium compound in a liquid medium. An unreacted titanium compound remains soluble in the liquid medium, while reacted titanium species and supported magnesium species are insoluble in this liquid medium.

As used herein, the concept of supporting a material on a carrier is intended to connote the incorporation of the material (e.g., magnesium compounds and/or titanium compounds) onto the carrier by physical or chemical means. Accordingly, supported material need not necessarily be chemically bound to the carrier.

Catalysts produced according to the present invention may be described in terms of the manner in which they can be made. More particularly, these catalysts can be described in terms of the manner in which a suitable carrier may be treated in order to form such catalysts.

Suitable carrier materials which may be treated include solid, porous carrier materials such as silica, alumina and combinations thereof. Such carrier materials may be amorphous or crystalline. These carriers may be in the form of particles having a particle size of from about 0.1 micron to about 250 microns, preferably from 10 to about 200 microns, and most preferably from about 10 to about 80 microns. Preferably, the carrier is in the form of spherical particles, e.g., spray dried silica. The internal porosity of these carriers may be larger than 0.2 cm$^3$/gm, e.g., larger than about 0.6 cm$^3$/g. Internal porosity of carriers can be determined by a technique termed BET-technique, described by S. Brunauer, P. Emmett and E. Teller in *Journal of the American Chemical Society*, 60, pp. 209–319 (1938). The specific surface area of these carriers is at least 3 m$^2$/g, preferably at least about 50 m$^2$/g, and more preferably from, e.g., about 150 to about 1500 m$^2$/g. Specific surface areas of carriers can be measured in accordance with the above-mentioned BET-technique, with the use of the standardized method as described in *British Standards* BS 4359, Volume 1, (1969).

It is desirable to remove physically bound water from the carrier material prior to contacting this material with water-reactive organomagnesium compounds. This water removal may be accomplished by heating the carrier material to a temperature from about 100° C. to an upper limit of temperature represented by the temperature at which sintering occurs. A suitable range of temperatures may, thus, be from about 100° C. to about 800° C., e.g., from about 150° C. to about 650° C.

Silanol (Si—OH) groups may be present in the silica carrier when it is contacted with organomagnesium compounds in accordance with the present invention. These Si—OH groups may be present at from about 0.5 to about 5 mmoles of OH groups per gram of carrier, but a preferred range is from about 0.4 to about 0.9 mmoles of OH groups per gram of carrier. Excess OH groups present in the carrier may be removed by heating the carrier for a sufficient time at an elevated temperature. A relatively small amount of OH groups may be removed by heating at from about 150° C. to about 250° C., whereas a relatively large amount of OH groups may be removed by heating at at least 500° or 800° C., most especially, from about 550° C. to about 650° C. The duration of heating may be from 4 to 16 hours. In a most preferred embodiment, the carrier is silica which, prior to the use thereof in the first catalyst synthesis step, has been dehydrated by fluidizing it with nitrogen or air and heating at least about 600° C. for about 16 hours to achieve a surface hydroxyl group concentration of about 0.7 mmols/gm. The surface hydroxyl concentration of silica may be determined according to J. B. Peri and A. L. Hensley, Jr., *J. Phys. Chem.*, 72 (8), 2926 (1968). The silica of the most preferred embodiment is amorphous silica with a surface area of 300 m$^2$/gm and a pore volume of 1.65 cm$^3$/gm. This material is marketed under the tradenames of Davison 952 or Davison 955 by the Davison Chemical Division of W. R. Grace and Company. The surface hydroxyl concentration in this material is about 0.72 mmol/g.

While heating is a preferred means of removing OH groups inherently present in a carrier such as silica, other removal means are also possible such as chemical means. For example, a desired fraction of OH groups may be reacted with a chemical agent such as a hydroxyl-reactive organoaluminum compound, e.g., triethylaluminum.

Other examples of suitable carrier materials are described in the Graff, U.S. Pat. No. 4,173,547. Note particularly the passage extending from column 3, line 62 to column 5, line 44 of this Graff patent.

The carrier material is slurried in a non-polar solvent and the resulting slurry is contacted with at least one organomagnesium compound. The slurry of the carrier material in the solvent is prepared by introducing the carrier into the solvent, preferably while stirring, and heating the mixture to about 25° to about 100° C., preferably to about 40° to about 60° C. The slurry is then contacted with the aforementioned organomagnesium compound, while the heating is continued at the aforementioned temperature.

The organomagnesium compound has the empirical formula

where R and R' are the same or different C$_2$–C$_{12}$ alkyl groups, preferably C$_4$–C$_{10}$ alkyl groups, more preferably C$_4$–C$_8$ alkyl groups, and most preferably both R and R' are butyl groups, and m and n are each 0, 1 or 2, providing that m+n=2.

Suitable non-polar solvents are materials in which all of the reactants used herein, e.g., the organomagnesium compound, the transition metal compound, and the silicon compound are at least partially soluble and which are liquid at reaction temperatures. Preferred non-polar solvents are alkanes, such as isopentane, hexane, heptane, octane, nonane, and decane, although a variety of other materials including cycloalkanes, such as cyclohexane, aromatics, such as benzene and ethylbenzene, may also be employed. The most preferred non-polar solvents are isopentane, hexane, or heptane. Prior to use, the non-polar solvent should be purified, such as by percolation through molecular sieves, to remove traces of water, oxygen, polar compounds, and other materials capable of adversely affecting catalyst activity.

In the most preferred embodiment of the synthesis of this catalyst it is important to add only such an amount of the organomagnesium compound that will be completely deposited—physically or chemically—onto the support since any excess of the organomagnesium compound in the solution may react with other synthesis chemicals and precipitate outside of the support. The carrier drying temperature affects the number of sites on the carrier available for the organomagnesium compound—the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited onto the support without leaving any excess of the organomagnesium compound in the solution. Furthermore, it is believed that the molar amount of the organomagnesium compound deposited onto the support is greater than the molar content of the hydroxyl groups on the support. Thus, the molar ratios given below are intended only as an approximate guideline and the exact amount of the organomagnesium compound in this embodiment must be controlled by the functional limitation discussed above, i.e., it must not be greater than that which can be deposited onto the support. The amount of the organomagnesium compound which is not greater than that deposited onto the support can be determined in any conventional manner, e.g., by adding the organomagnesium compound to the slurry of the carrier in the solvent, while stirring the slurry, until the organomagnesium compound is detected in the solvent.

For example, for the silica carrier heated at about 600° C., the amount of the organomagnesium compound added to the slurry is such that the molar ratio of Mg to the hydroxyl groups in the carrier is about 1:1 to about 4:1, preferably about 1.1:1 to about 2.8:1, more preferably about 1.2:1 to about 1.8:1 and most preferably about 1.4:1.

It is also possible to add such an amount of the organomagesium compound which is in excess of that which will be deposited onto the support, and then remove its excess, e.g., by filtration and washing. However, this alternative is less desirable than the most preferred embodiment described above.

The amount of the magnesium compound which is impregnated onto the carrier should be sufficient to react with the subsequently added silane compound and then the tetravalent titanium compound in order to incorporate a catalytically effective amount of titanium on the carrier in the manner set forth herein below.

An essential component in the production of the catalyst composition of the invention is the use of one or more silane compounds free of hydroxy groups in the second step of the catalyst preparation procedure. The silane compound has the empirical formula $(R^1O)_x SiR^2_y$ wherein x is 1, 2, 3, or 4 and $y=4-x$; $R^1$ is a hydrocarbyl group of 1 to 10 carbon atoms; and $R^2$ is halogen, preferably chlorine, hydrogen or a hydrocarbyl group of 1 to 10 carbon atoms. Preferred species of this empirical formula are those defined by $Si(OR)_4$ wherein R is a $C_1-C_{10}$ hydrocarbyl group. Hydrocarbyl groups include alkyl, aryl, arylalkyl, alkenyl and arylalkenyl groups, containing 1 to 10 carbon atoms. Specific silane compounds which can be used in accordance with the invention include
tetramethoxysilane, dimethoxydimethylsilane,
tetraethoxysilane, phenoxytrimethylsilane,
triethoxyethylsilane, diethoxydiethylsilane,
chlorotriethoxysilane, phenyltriethoxysilane,
ethoxytriethylsilane, tetraisopropoxysilane,
diisopropoxydiisopropylsilane, tetrapropoxysilane,
dipropoxydipropylsilane, tetrabutoxysilane,
dibutoxydibutylsilane, diethoxydiphenylsilane,
tetraphenoxysilane, triethoxyphenylsilane,
tetrakis(2-methoxyethoxy)silane,
tetrakis(2-ethylhexoxy)silane, and tetraallyloxysilane.

The slurry of the carrier material containing organomagnesium species is maintained in the solvent at temperatures of about 40° to about 60° C., for introduction of the silane compound. The amount of the silane compound added to the slurry is such that the molar ratio of silane to Mg fixed on the solid carrier after the first treatment with a organomagnesium compound is about 0.30 to about 1.40.

In a preferred embodiment, prior to the silane compound incorporation into the first organomagnesium-containing intermediate, the intermediate is treated with $SiCl_4$. The molar ratio of $SiCl_4$ to Mg fixed on the solid carrier ranges from 0.30 to 1.40.

In the next step, the slurry is contacted with at least one transition metal compound soluble in the non-polar solvent. This synthesis step is conducted at about 25° to about 65° C., preferably at about 30° to about 60° C., and most preferably at about 45° to about 55° C. In a preferred embodiment, the amount of the transition metal compound added is not greater than that which can be deposited onto the carrier. The exact molar ratio of Mg to the transition metal and of the transition metal to the hydroxyl groups of the carrier will therefore vary (depending, e.g., on the carrier drying temperature) and must be determined on a case-by-case basis. For example, for the silica carrier heated at about 200° to about 850° C., the amount of the transition metal compound is such that the molar ratio of the transition metal compound to the hydroxyl groups of the carrier is about 1 to about 2.0, preferably about 1.3 to about 2.0. The amount of the transition metal compound is also such that the molar ratio of Mg fixed after the first treatment to the transition metal is equal to 0.5 to about 3, preferably about 1 to about 2. These molar ratios appear to produce a catalyst compound which produces resins having relatively low MFR values of about 20 to about 45. As is known to those skilled in the art, such resins can be utilized to produce high-strength LLDPE films.

Suitable transition metal compounds used herein are compounds of metals of Groups IVA, VA, VIA or VIII of the Periodic Chart of the Elements, as published by the Fisher Scientific Company, Catalog No. 5-702-10, 1978 providing that such compounds are soluble in non-polar solvents. Non-limiting examples of such compounds are titanium halides (e.g., titanium tetrachloride), titanium alkoxides, wherein the alkoxide moiety consists of an alkyl radical of 1 to about 6 carbon atoms, or mixtures thereof, vanadium halides, (vanadium tetrachloride, vanadium oxytrichloride), and vanadium alkoxides. The preferred transition metal compounds are titanium compounds, preferably tetravalent titanium compounds. The most preferred titanium compound is titanium tetrachloride. Mixtures of such transition metal compounds may also be used and generally no restrictions are imposed on the transition metal compounds which may be included Any transition metal compound that may be used alone may also be used in conjunction with other transition metal compounds.

The reaction of the transition metal compound, such as a tetravalent titanium compound, in the liquid medium conveniently takes place by slurrying the solid carrier containing the reactive magnesium species in a solution of the tetravalent titanium compound and heating the reaction medium to a suitable temperature, e.g., to the reflux temperature of the solvent at atmospheric pressure. Preferred solvents for the tetravalent titanium compounds are hexane or isopentane or heptane.

The volume of the tetravalent titanium compound solution to treated carrier may be from about 0.1 to about 10 ml per gram of such carrier. The concentration of the tetravalent titanium solution may be from about 0.1 to about 9 mole/liter. The molar ratio of the tetravalent titanium compound to the organomagnesium compound after the first treatment may be from about 0.3 to about 2, more particularly from about 0.7 to about 1.4. An unreacted titanium compound may be removed by suitable separation techniques such as decantation, filtration and washing.

After transition metal (e.g. titanium) incorporation, an essential final step in the catalyst precursor synthesis comprises a second addition of an organomagnesium compound to the titanium-containing intermediate. This additional treatment with an organomagnesium compound unexpectedly produces superior catalyst compositions. They form ethylene copolymer resins with properties different from those of the resins prepared with the catalysts, the synthesis of which did not include this second treatment with an organomagnesium compound The differences in the resin properties are disclosed below.

The organomagnesium compound used in the last step of the catalyst precursor preparation has the empirical formula

$R_mMgR'_n$ where R and R' are the same or different $C_2-C_{12}$ alkyl groups, preferably $C_4-C_{10}$ alkyl groups, more preferably $C_4-C_8$ alkyl groups, and most preferably both R and R' are butyl groups, and m and n are each 0, 1 or 2, providing that m+n=2. The molar ratio of the organomagnesium compound used in the last step to the organomagnesium compound used in the first step ranges from 0.5 to 1.5.

This second treatment with an organomagnesium compound increases the catalytic activity of the resulting catalyst, compared to the activity of the catalyst formed with a single organomagnesium incorporation step, and increases the melt flow index response to hydrogen, compared to the melt flow index response of the catalyst formed with a single organomagnesium incorporation step.

The supported catalyst precursor formed from the components described above is then activated with dimethylaluminum dichloride (DMAC) as a cocatalyst. The catalyst may be activated in situ by adding DMAC and the catalyst precursor separately to the polymerization medium. It is also possible to combine the catalyst precursor and the cocatalyst before their introduction into the polymerization medium, e.g., for up to about 2 hours at a temperature from about −40° to about 80° C.

DMAC is used in an amount which is at least effective to promote the polymerization activity of the solid catalyst precursor of this invention. The amount of DMAC is sufficient to give an Al:transition metal molar ratio in the catalyst precursor of about 2 to about 500, preferably about 10 to about 300, and most preferably about 20 to about 250.

We found that the combination of the herein-described catalyst precursors with DMAC produces polymerization catalyst compositions which copolymerize ethylene and alpha-olefins to copolymers believed to have a substantially improved branching distribution. The more uniform branching distribution is manifested by the fact that the ethylene copolymers made with the catalysts of this invention have crystalline melting points about 1°-2° C. lower than those of polymers made with the same catalyst but activated with trimethylaluminum. As is known to those skilled in the art, such a decrease in melting points indicates a substantially improved distribution of side chain branches among the copolymer molecules.

These catalysts are particularly useful for the production of LLDPE resins. Such resins may have a density of 0.94 g/cc or less, preferably 0.930 or less or even 0.925 g/cc or less. Using the catalysts of the present invention, it is possible to achieve densities of less than 0.915 g/cc and even 0.900 g/cc.

Advantageous properties of conventional LLDPE resins are described in the Anderson et al U.S. Pat. No. 4,076,698. These resins may be copolymers of ethylene with one or more $C_3-C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers.

The resins of this invention are unique in that they exhibit bimodal molecular weight distributions, that is, contain two molecular weight fractions, a relatively lower molecular weight component and a relatively higher molecular weight component. This is illustrated in the DRAWING. The dotted line shows the GPC curve of a resin produced with one of the catalysts of the invention. The resin has a bimodal molecular weight distribution and contains both a relatively high molecular weight component and a relatively lower molecular weight component. By comparison, the GPC curve of the resin formed with a catalyst produced with a single organomagnesium compound incorporation step is shown as a solid line; and this resin has a trimodal molecular weight distribution and contains a very low molecular weight fraction, which is detrimental because it causes smoking and odor during resin processing. In agreement with the molecular weight distribution data, the MFR values of the resins prepared with the catalysts twice treated with organomagnesium compounds are lower (30-32) compared to the MFR values of the resins prepared with the catalysts treated with an organomagnesium compound Lone time (MFR=40-50). The relatively low MFR values of the polymers prepared with the catalysts of this invention also indicate that they are suitable for the preparation of various film products since such films are likely to have excellent strength properties.

The LLDPE resins produced in accordance with the present invention preferably contain at least about 80 percent by weight of ethylene units. Most preferably, the LLDPE resins of the invention contain at least 2 weight percent, for example from 2 to 20 weight percent of an alpha-olefin.

Ethylene and alpha-olefins may be copolymerized with the catalysts prepared according to aspects of the present invention by any suitable process. Such processes include polymerizations carried out in suspension, in solution or in the gas phase.

A particularly desirable method for producing LLDPE resins, according to the present invention, is in a fluid bed reactor. Such a reactor and means for operating same is described in the Levine et al U.S. Pat. No. 4,011,382 or the Karol et al U.S. Pat. No. 4,302,566, each of which is relied upon and incorporated by reference herein. The activity of the catalyst produced in accordance with the present invention is sufficient to produce LLDPE resins such as ethylene/1-hexene copolymers having a density of less than 0.940 g/cc, in such a fluid bed reactor.

In order to achieve the desired density ranges in the copolymers it is necessary to copolymerize enough of the alpha-olefin comonomers with ethylene to achieve a level of 1 to 5 mol percent of the comonomer in the copolymer. The amount of the comonomer needed to achieve this result will depend on the particular comonomer(s) employed.

In accordance with the invention, it has unexpectedly been found that using a gas phase catalytic polymerization reaction, 1-hexene can be incorporated into ethylene-based copolymer chains with high efficiency. As a result, a relatively small concentration of 1-hexene in the gas phase reactor can lead to a relatively large incorporation of 1-hexene into the copolymers: in amounts up to 15 percent by weight, preferably 4 to 12 percent by weight, to produce LLDPE resins having a density of less than 0.940 g/cc.

For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density of about 0.91 to 0.92, and temperatures of about 80° to 100° C. are used to prepare products having a density of about 0.92 to 0.94, and temperatures of about 90° to 115° C. are used to prepare products having a density of about 0.94 to 0.96. The fluid-bed reactor is operated at pressures of up to about 1000 psi, and is preferably operated at a pressure of from about 150 to 350 psi.

The supported catalyst systems of this invention yield products having an average particle size between about 0.01 to about 0.07 inches and preferably about 0.02-0.04 inches.

Films having especially desirable properties may be formed with the above-mentioned ethylene/1-hexene copolymers prepared with the catalysts of the present invention by a variety of techniques. For example, desirable blown films as well as slot cast films may be formed. The resins of the invention also lend themselves to high stalk extrusion.

Blown films formed from ethylene 1-hexene copolymers having a density from 0.916 to 0.928 g/cc may have especially desirable properties for plastic bag manufacture. A particular example of a blown film formed from an ethylene/1-hexene copolymer having a density of 0.927 and an $I_2$ of 1, which is, in turn, formed in a gas-phase, fluid-bed reactor with a catalyst according to the present invention, is a blown film having an improved dart impact strength, enhanced Elmendorf tear strength in the machine direction of the film and high tensile strength.

Slot-cast films formed from LLDPE ethylene 1-hexene copolymers having a density of from about 0.916 to about 0.92 may have especially desirable properties as pallet stretch wrap. A particular example of a slot cast film formed from an ethylene/1-hexene copolymer having a density of about 0.92 and $I_2$ of 1.7 which is, in turn, formed in a gas-phase, fluid-bed reactor with a catalyst according to the present invention, is a slot-cast film having a thickness of 1 mil, an improved tensile strength and a very high Elmendorf tear strength in the transverse direction of the film.

The following Examples give examples of reactants and parameters which may be used in accordance with aspects of the present invention.

The properties of the polymers produced in the Examples and any calculated process parameters were determined in the following manner:

Density: ASTM D 1505—A plaque is made and conditioned for one hour at 100° C. to approach equilibrium crystallinity. Measurement for density is then made in a density gradient column; reported as g/cc.

Melt Index $I_2$: ASTM D-1238—Condition E—Measured at 190° C.—reported as grams per 10 minutes.

High Load Melt Index $I_{21}$: ASTM D-1238—Condition F—Measured at 10 times the weight used in the Melt Index test, above.

Melt Flow Ratio (MFR)=$I_{21}/I_2$

Melting points of copolymers were measured by the differential scanning calorimetry (DSC) method, at a heating rate of 2° C./min. Samples were preliminarily annealed by heating to 150° C. and subsequently by cooling them at a rate of 0.5° C./min. to 40° C.

EXAMPLES

Example 1—Preparation of Catalyst Precursor

All manipulations were conducted under a nitrogen atmosphere by using standard Schlenk techniques. Into a 200 ml Schlenk flask was placed 7.0 grams of Davison-grade 955 silica which was previously dried under a nitrogen purge at 600° C. for about 16 hours. Heptane (90 ml) was added to slurry the silica. Dibutylmagnesium (7.0 mmol) was added to the stirred slurry at 50°-55° C. and stirring was continued for one hour. Then SiCl₄ (4.6 mmol) was added and the mixture was stirred at ca. 55° C. for another hour. Then tetrabutoxysiloxane (4.6 mmol) was added to the slurry (50°-55° C.) and stirring was continued for one hour. TiCl₄ (7.0 mmol) was added to the reaction medium (50°-55° C.) and stirring was continued for an additional hour. Finally, dibutylmagnesium (7.0 mmol) was added to the slurry at 50°-55° C. The final mixture was stirred for about one hour and then heptane was removed by evaporation under a strong nitrogen flow to yield 10.2 grams of light brown powder ([Ti]=2.91 wt. %).

Example 2—Preparation of Catalyst Precursor

This experiment involved the same preparation of the catalyst precursor as in Example 1 except that the second dibutylmagnesium treatment was omitted.

Example 3—Preparation of Catalyst Precursor

This experiment involved the same preparation of the catalyst precursor as in Example 1 except that the SiCl$_4$ reagent treatment step was omitted.

Example 4—Preparation of Catalyst Precursor

This experiment involved the same preparation of the catalyst precursor as in Example 3 except that the second dibutylmagnesium treatment was omitted.

Ethylene/1-hexene copolymers were prepared with these four catalysts precursors. A typical example using the catalyst precursor of Example 1 is described below.

A 1.6 liter stainless steel autoclave under a slow nitrogen purge at 50° C. was filled with dry heptane (750 ml) and 1-hexene (120 ml), and 3.0 mmol of DMAC was added. The stirring rate was set at 1000 rpm and the temperature was increased to 93° C. The reactor pressure was raised 76 psi with hydrogen. Ethylene was introduced to maintain the pressure at about 184 psi. Then the temperature was decreased to 80° C., 24 mg of Catalyst Precursor of Example 1 was introduced into the reactor with ethylene over-pressure, and the temperature was increased and held at 93° C. The polymerization was continued for 60 minutes, and then the ethylene supply was stopped and the reactor was allowed to cool. The copolymer was collected and dried. The yield was 54 grams.

TABLE

| Catalyst of Precursor of: | H2/C2* | Productivity** | Mole % Hexene | I$_{21}$ | MFR | Tm*** |
|---|---|---|---|---|---|---|
| Example 1 | 1.04 | 2730 | 3.4 | 37.9 | 31.4 | 124.68 |
| Example 2 | 0.98 | 1170 | 2.8 | 7.9 | 45.1 | 125.45 |
| Example 3 | 1.05 | 2130 | 3.35 | 33.3 | 30.5 | 125.04 |
| Example 4 | 1.02 | 1330 | 3.1 | 18.7 | 40.6 | 125.57 |

*Hydrogen/Ethylene molar ratio in the gas phase.
**Productivity is given in units of gram polymer/gram catalyst-h-100 psi ethyl.
***Melting point of the resin.

The table lists hydrogen/ethylene ratios in the gas phase employed in the polymerization reactions, catalyst productivities, polymer melt flow indexes ($I_{21}$), melt flow ratios (MFR=$I_{21}/I_2$), hexene contents in polymers (mol. %), and the resin melting points.

The results show that the catalyst twice treated with dibutylmagnesium (Examples 1 and 3 have higher productivities compared to the catalysts treated one time with dibutylmagnesium (Examples 2 and 4). Moreover, at the same hydrogen/ethylene molar ratio in the gas phase (about 1.0) the $I_{21}$ values of the resins produced with twice treated catalysts are higher, indicating a better melt flow index response.

Resins prepared with catalysts twice treated with organomagnesium compounds (Examples 1 and 3) have narrower molecular weight distributions, as evident from their lower MFR values and their relatively low $M_w/M_n$ ratios (about 5) compared to those of the resins prepared with the single treated catalysts (Examples 2 and 4, $M_w/M_n$ ratios of about 15) and higher MFR values. Resins produced with the catalysts twice treated with organomagnesium compounds exhibit more uniform compositional distributions, as evident from their lower melting points compared to those of the resins produced with the single treated catalysts.

Thus it is apparent that there has been provided, in accordance with the invention, catalyst compositions which are effective to form copolymers of ethylene, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A catalyst composition for copolymerization of ethylene with alpha-olefins, to produce LLDPE resin products of a bimodal molecular weight distribution, having a relatively low molecular weight component and a relatively high molecular weight component, wherein the catalyst is prepared by a process which comprises the steps of:
   (i) contacting a slurry of a solid, porous carrier having reactive OH groups in a non-polar liquid with dibutylmagnesium to form a product of step (i) which contains said carrier and incorporated therein a source of magnesium;
   (ii) contacting said product of step (i) with tetrabutoxysilane to form an intermediate of step (ii)
   (iii) contacting said intermediate of step (ii) with at least one transition metal compound in a non-polar liquid medium, the number of moles of said transition metal compound being in excess of the number of OH groups on said carrier prior to reaction with said dibutylmagnesium in step (i), said transition metal compound being soluble in said non-polar liquid and said magnesium-containing carrier being substantially insoluble in said liquid medium, whereby a reacted form of the transition metal becomes supported on said carrier; and
   (iv) contacting said transition metal-containing intermediate with an additional quantity of dibutylmagnesium to prepare a catalyst precursor of step (iv);
   (v) contacting said catalyst precursor of step (iv) with an activating amount of dimethylaluminum chloride, to produce said catalyst.

2. A catalyst composition for copolymerization of ethylene with an alpha-olefins, to produce LLDPE resin products of a bimodal molecular weight distribution, having a relatively low molecular weight component and a relatively high molecular weight component, wherein the catalyst is prepared by a process which comprises the steps of:
   (i) contacting a solid, porous carrier having reactive OH groups with a liquid, said liquid containing at least one organomagnesium compound having the empirical formula $R_m MgR'_n$ where R and R' are the same or different $C_1$-$C_{12}$ alkyl groups, and m+n=2, to form a product of step (i) which contains said carrier and incorporated therein a source of magnesium;
   (ii) contacting said product of step (i) with tetrabutoxysilane to form an intermediate of step (ii)

(iii) contacting said intermediate of step (ii) with at least one transition metal compound in a non-polar liquid medium, the number of moles of said transition metal compound being in excess of the number of OH groups on said carrier prior to reaction with said organomagnesium compound in step (i), said transition metal compound being soluble in said non-polar liquid, and said magnesium-containing carrier being substantially insoluble in said liquid medium, whereby a reacted form of the transition metal becomes supported on said carrier; and (iv) contacting said transition metal-containing intermediate with an additional quantity of an organomagnesium compound having the empirical formula $$R_m MgR'_n$$

where R and R' are the same or different $C_1$-$C_{12}$ alkyl groups, and $m+n=2$, to prepare a catalyst precursor of step (iv);

(v) contacting said catalyst precursor of step (iv) with an activating amount of dimethylaluminum chloride.

3. A catalyst composition for copolymerization of ethylene with alpha-olefins, to produce LLDPE resin products of a bimodal molecular weight distribution, having a relatively low molecular weight component and a relatively high molecular weight component, wherein the catalyst is prepared by a process which comprises the steps (i) contacting a slurry of a solid, porous carrier having reactive OH groups in a non-polar liquid with dibutylmagnesium to form a product of step (i) which contains said carrier and incorporated therein a source of magnesium;

(ii) contacting said product of step (i) with at least one compound of the formula $$(R^1O)_x SiR^2_y$$

wherein x is 1, 2, 3, or 4 and $y=4-x$; $R^1$ is a hydrocarbyl group of 1 to 10 carbon atoms; and $R^2$ is halogen or a hydrocarbyl group of 1 to 10 carbon atoms, or hydrogen to form an intermediate of step (ii)

(iii) contacting said intermediate of step (ii) with at least one transition metal compound in a non-polar liquid medium, the number of moles of said transition metal compound being in excess of the number of OH groups on said carrier prior to reaction with said dibutylmagnesium in step (i), said transition metal compound being soluble in said non-polar liquid and said magnesium-containing carrier being substantially insoluble in said liquid medium, whereby a reacted form of the transition metal becomes supported on said carrier; and (iv) contacting said transition metal-containing intermediate with an additional quantity of dibutylmagnesium to prepare a catalyst precursor of step (iv);

(v) contacting said catalyst precursor of step (iv) with an activating amount of dimethylaluminum chloride.

4. A catalyst composition for copolymerization of ethylene with alpha-olefins, to produce LLDPE resin products of a bimodal molecular weight distribution, having a relatively low molecular weight component and a relatively high molecular weight component, wherein the catalyst is prepared by a process which comprises the steps of:

(i) contacting a slurry of a solid, porous carrier having reactive OH groups in a non-polar liquid with dibutylmagnesium to form a product of step (i) which contains said carrier and incorporated therein a source of magnesium;

(ii) contacting said product of step (i) with silicon tetrahalide to form an intermediate of step (ii)

(iii) contacting said product of step (ii) with tetrabutoxysilane to form an intermediate of step (iii)

(iv) contacting said intermediate of step (iii) with at least one transition metal compound in a non-polar liquid medium, the number of moles of said transition metal compound being in excess of the number of OH groups on said carrier prior to reaction with said dibutylmagnesium in step (i), said transition metal compound being soluble in said non-polar liquid, and said magnesium-containing carrier being substantially insoluble in said liquid medium, whereby a reacted form of the transition metal becomes supported on said carrier; and (v) contacting said transition metal-containing intermediate with an additional quantity of dibutylmagnesium to prepare a catalyst precursor of step (v);

(vi) contacting said catalyst precursor of step (v) with an activating amount of dimethylaluminum chloride.

5. A catalyst composition for copolymerization of ethylene with alpha-olefins, to produce LLDPE resin products of a bimodal molecular weight distribution, having a relatively low molecular weight component and a relatively high molecular weight component, wherein the catalyst is prepared by a process which comprises the steps of:

(i) contacting a slurry of a solid, porous carrier having reactive OH groups in a non-polar liquid with dibutylmagnesium to form a product of step (i) which contains said carrier and incorporated therein a source of magnesium;

(ii) contacting said product of step (i) with silicon tetrahalide to form an intermediate of step (ii)

(iii) contacting said product of step (ii) with at least one compound of the formula $$(R^1O)_x SiR^2_y$$

wherein x is 1, 2, 3, or 4 and $y=4-x$; $R^1$ is a hydrocarbyl group of 1 to 10 carbon atoms; and $R^2$ is halogen or a hydrocarbyl group of 1 to 10 carbon atoms, or hydrogen to form an intermediate of step (iii)

(iv) contacting said intermediate of step (iii) with at least one transition metal compound in a liquid medium, the number of moles of said transition metal compound being in excess of the number of OH groups on said carrier prior to reaction with said dibutylmagnesium in step (i), said transition metal compound being soluble in said liquid, and said magnesium-containing carrier being substantially insoluble in said liquid medium, whereby a reacted form of the transition metal becomes supported on said carrier; and (v) contacting said transition metal-containing intermediate with an additional quantity of dibutylmagnesium to prepare a catalyst precursor of step (v);

(vi) contacting said catalyst precursor of step (v) with an activating amount of dimethylaluminum chloride.

6. A catalyst composition for copolymerization of ethylene with alpha-olefins, to produce LLDPE resin products of a bimodal molecular weight distribution, having a relatively low molecular weight component and a relatively high molecular weight component, wherein the catalyst is prepared by a process which comprises the steps of:

(i) contacting a solid, porous carrier having reactive OH groups with a non-polar liquid containing at least one organomagnesium compound having the empirical formula $R_m MgR'_n$ where R and R' are the same or different $C_1$-$C_{12}$ alkyl groups, and m+n=2, to form a product of step (i) which contains said carrier and incorporated therein a source of magnesium;

(ii) contacting said product of step (i) with silicon tetrahalide to form an intermediate of step (ii)

(iii) contacting said product of step (ii) with tetrabutoxysilane to form an intermediate of step (iii)

(iv) contacting said intermediate of step (iii) with at least one transition metal compound in a non-polar liquid medium, the number of moles of said transition metal compound being in excess of the number of OH groups on said carrier prior to reaction with said organomagnesium compound in step (i), said transition metal compound being soluble in said liquid, and said magnesium-containing carrier being substantially insoluble in said liquid medium, whereby a reacted form of transition metal becomes supported on said carrier; and (v) contacting said transition metal-containing intermediate with an additional quantity of at least one organomagnesium compound having the empirical formula $R_m MgR'_n$ where R and R' are the same or different $C_1$-$C_{12}$ alkyl groups, and m+n=2, to prepare a catalyst precursor of step (v), (vi) contacting said catalyst precursor of step (v) with an activating amount of dimethylaluminum chloride.

7. A catalyst composition for copolymerization of ethylene with alpha-olefins, to produce LLDPE resin products of a bimodal molecular weight distribution, having a relatively low molecular weight component and a relatively high molecular weight component, wherein the catalyst is prepared by a process which comprises the steps of:

(i) contacting a solid, porous carrier having reactive OH groups with a non-polar liquid, said liquid containing at least one organomagnesium compound having the empirical formula $R_m MgR'_n$ where R and R' are the same or different $C_1$-$C_{12}$ alkyl groups, and m+n=2, wherein said organomagnesium compound is soluble in said non-polar liquid, to form a product of step (i) which contains said carrier and incorporated therein a source of magnesium;

(ii) contacting said product of step (i) with at least one compound selected from the group consisting of (a) $SiCl_4$ and (b) a compound of the formula $(R^1O)_x SiR^2_y$ wherein x is 1, 2, 3, or 4 and y=4−x; $R^1$ is a hydrocarbyl group of 1 to 10 carbon atoms; and $R^2$ is halogen or a hydrocarbyl group of 1 to 10 carbon atoms, or hydrogen to form an intermediate of step (ii);

(iii) contacting said intermediate of step (ii) with at least one transition metal compound in a non-polar liquid medium, the number of moles of said transition metal compound being in excess of the number of OH groups on said carrier prior to reaction with said organomagnesium compound in step (i), said transition metal compound being soluble in said liquid, and said magnesium-containing carrier being substantially insoluble in said liquid medium, whereby a reacted form of the transition metal becomes supported on said carrier; and (iv) contacting said transition metal-containing intermediate with an additional quantity of $R_m Mg R'_n$ where R and R' are the same or different $C_1$-$C_{12}$ alkyl groups, and m+n=2, to prepare a catalyst precursor of step (iv);

(v) contacting said catalyst precursor of step (iv) with an activating amount of dimethylaluminum chloride, to produce said catalyst.

8. The catalyst of claim 7, wherein the silane compound is selected from the group consisting of $Si(OR)_4$ and $Si(R'O)_x(R''')_{(4-x)}$ wherein each of R and R'' is a $C_1$-$C_{10}$ hydrocarbyl group, wherein R''' is chlorine, or a $C_1$-$C_{10}$ hydrocarbyl group or hydrogen and x=1, 2 or 3.

9. The catalyst of claim 7, wherein the said hydrocarbyl group is selected from the group consisting of alkyl, aryl, arylalkyl, alkenyl and arylalkenyl groups and contains 1 to 10 carbon atoms.

10. The catalyst of claim 9, wherein said hydrocarbyl group contains 2 to 6 carbon atoms.

11. The catalyst of claim 10, wherein said silane compound is selected from the group consisting of tetramethoxysilane, dimethoxydimethylsilane, tetraethoxysilane, triethoxyethylsilane, diethoxydiethylsilane, chlorotriethoxysilane, phenyltriethoxysilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, diethoxydiphenylsilane, phenoxytrimethylsilane, tetraphenoxysilane, triethoxyphenylsilane, tetrakis(2-methoxyethoxy) silane, tetrakis(2-ethylhexoxy) silane, and tetraallyloxysilane.

12. The catalyst of claim 11, wherein said silane compound is selected from the group consisting of tetraethoxysilane, chlorotriethoxysilane, phenyltriethoxysilane, tetrakis(2-ethylhexoxy)silane, tetraallyloxysilane and tetrabutoxysilane.

13. The catalyst composition of claim 12 wherein, in step (i), the ratio of the number of moles of said organomagnesium compound to the number of moles of said OH groups on said solid porous carrier is from about 1.1 to about 2.5, wherein in step (ii) the molar ratio of the silane compound to Mg fixed on the solid carrier after the first treatment with an organomagnesium compound is 0.30 to 1.40.

14. The catalyst of claim 13, wherein, in step (i), the ratio of the number of moles of said organomagnesium compound to the number of moles of OH groups on said solid porous carrier is from about 1.0 to about 2.5.

15. A catalyst composition of claim 14, wherein, in step (i), the ratio of the number of moles of said organomagnesium compound to the number of moles of OH groups on said solid porous carrier is from about 1.1 to about 1.8.

16. The catalyst of claim 15, wherein the molar ratio of dimethylaluminum chloride to the transition metal ranges from 1 to 500.

17. The catalyst of claim 16, wherein the transition metal is provided as a tetravalent titanium compound.

18. The catalyst of claim 17, wherein the transition metal compound is titanium tetrachloride.

19. A catalyst which consists of the catalyst of claim 1.

20. A catalyst which consists of the catalyst of claim 2.

21. A catalyst which consists of the catalyst of claim 3.

22. A catalyst which consists of the catalyst of claim 4.

23. A catalyst which consists of the catalyst of claim 5.

24. A catalyst which consists of the catalyst of claim 6.

25. A catalyst which consists of the catalyst of claim 7.

* * * * *

UNITED STATES PATENT AND TRADEMARK OFFICE
CERTIFICATE OF CORRECTION

PATENT NO. : 5,258,345

DATED : November 2, 1993

INVENTOR(S) : Yury V. Kissin et al.

It is certified that error appears in the above-identified patent and that said Letters Patent is hereby corrected as shown below:

Col. 16, line 35, Claim 8, "Si(R'O)" should read --Si(R"O)--.

Signed and Sealed this

Twenty-sixth Day of April, 1994

Attest:

BRUCE LEHMAN

Attesting Officer

Commissioner of Patents and Trademarks